United States Patent
Berthold et al.

[11] Patent Number: 5,845,033
[45] Date of Patent: Dec. 1, 1998

[54] FIBER OPTIC SENSING SYSTEM FOR MONITORING RESTRICTIONS IN HYDROCARBON PRODUCTION SYSTEMS

[75] Inventors: John W. Berthold, Salem; Daniel P. Birmingham, North Canton, both of Ohio

[73] Assignee: The Babcock & Wilcox Company, New Orleans, La.

[21] Appl. No.: 745,145

[22] Filed: Nov. 7, 1996

[51] Int. Cl.⁶ ..................................................... G02B 6/00
[52] U.S. Cl. .................. 385/12; 385/16; 385/27; 385/37; 356/32
[58] Field of Search .................. 385/12, 16, 27, 385/28, 30, 147, 10, 37; 356/32

[56] References Cited

U.S. PATENT DOCUMENTS

| | | | |
|---|---|---|---|
| 4,717,253 | 1/1988 | Pratt, Jr. | 356/32 |
| 4,806,012 | 2/1989 | Meltz et al. | 356/32 |

OTHER PUBLICATIONS

M. Davis et al., "Interrogation of 60 Fibre Bragg Grating Sensors with Microstrain Resolution Capability", Electronics Letters, vol. 32, Jul. 18, 1996 pp. 1393–1394.

M. Davis et al., "A 60 Element Fiber Bragg Grating Sensor System" Nava Research Laboratory, pp. 2–5 1996 (No Month).

Deepstar 200 Presentation Overheads, on Nov. 14, 1995.

*Primary Examiner*—Phan T. H. Palmer
*Attorney, Agent, or Firm*—Daniel S. Kalka; Robert J. Edwards

[57] ABSTRACT

A sensor apparatus and method for identifying a restriction in the flowline of a hydrocarbon production system, utilizes an optical fiber or optical fiber cable which is engaged along and preferably spirally wound around and along the flowline. Spaced apart strain gauges which are advantageously in the form of Bragg grating sensors, are engaged with the optical fiber at spaced locations along the flowline. The strain gauges are also engaged with the flowline to measure strain in the flowline. The hoop strain in particular indicates a change in pressure which can be measured by light signals supplied to and received from the optical fiber. Differences in strain along the flowline indicate pressure gradients in the flowline which in turn identify restrictions in the flowline.

18 Claims, 6 Drawing Sheets

FIBER OPTIC SENSING SYSTEM FOR MONITORING RESTRICTIONS IN HYDROCARBON PRODUCTION SYSTEMS

BACKGROUND OF THE INVENTION

1. Field of the Invention

The present invention relates in general to the monitoring of conditions in hydrocarbon flowlines, and in particular, to a new and useful method and apparatus for identifying a pressure gradient in a hydrocarbon production flowline, using fiber optic sensor cables, changes in the pressure gradient being indicative of a pressure buildup in the flowline.

2. Description of the Related Art

The flow of hydrocarbons through a production system is driven by the high pressure in the reservoir. Since wells are typically thousands of feet below the surface, the pressure must be sufficient to overcome the large hydrostatic head between the reservoir and the production facility. Production systems are designed such that the hydrostatic head is the major pressure loss in the system. Because of this, when a restriction occurs somewhere in the piping system, it will initially have little effect on the production flow since its hydraulic resistance is small relative to the large hydrostatic head. However, as the restriction grows, it will eventually become a significant part of the hydraulic resistance and severely limit, or even stop production flow.

The only indications available to an operator that a blockage may be forming are the reduction in production flow rate and the increase in well head pressure. While both can provide an indication that a blockage may be forming, a system capable of providing an early warning is needed so that corrective measures can be taken prior to formation of a significant restriction. Such a system would also permit real-time monitoring of the effectiveness of these corrective measures. The present invention uses a pressure measurement approach as an early warning system.

SUMMARY OF THE INVENTION

The present invention is directed to solving the aforementioned problem as well as others by providing a fiber optic sensing system for monitoring restrictions in hydrocarbon production facilities.

An object of the present invention is to provide an apparatus and method for monitoring restrictions in hydrocarbon production systems which utilize fiber optic cables that are engaged along flowlines of the hydrocarbon production system for measuring hoop strain in the flowline at multiple locations along the flowline. The hoop strain measurements are utilized to determine pressure gradients along the flowline which, in turn, may represent the building of obstructions in the flowline.

A further object of the present invention is to provide such an apparatus and method which takes advantage of Bragg grating sensors embedded in by the optical fiber cable along the flowline. In this way, a large number of sensors can be distributed at spaced locations along the flowline for measuring pressure gradient changes along flowlines of considerable length which are conventional in hydrocarbon production facilities.

A further object of the present invention is to provide a method and apparatus for monitoring restrictions in the flowlines of a hydrocarbon production system which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

During normal production operations, the pressure gradient along a hydrocarbon flowline is well defined by the various pressure losses in the piping system. The major losses are typically the gravitational losses due to changes in the elevation in the wellbore and riser, frictional losses along the wellbore, flowline, and riser tubes, and shock losses such as the loss across a choke valve. While the magnitude of these losses will vary as the composition and rates of the wellstream fluids change, the pressure gradient along the flowline should remain relatively constant, at least for similar flow regimes in the flowline. However, as a restriction forms in the line, such as occurs when a solid material deposits on the inside surface of the pipe wall, the pressure gradient through the restricted length will increase relative to the pressure gradient through the clear line. If one is able to measure this change in pressure gradient with sufficient resolution, the possibility exists for an early warning system that can monitor the buildup of the restriction over time.

Figure 1:
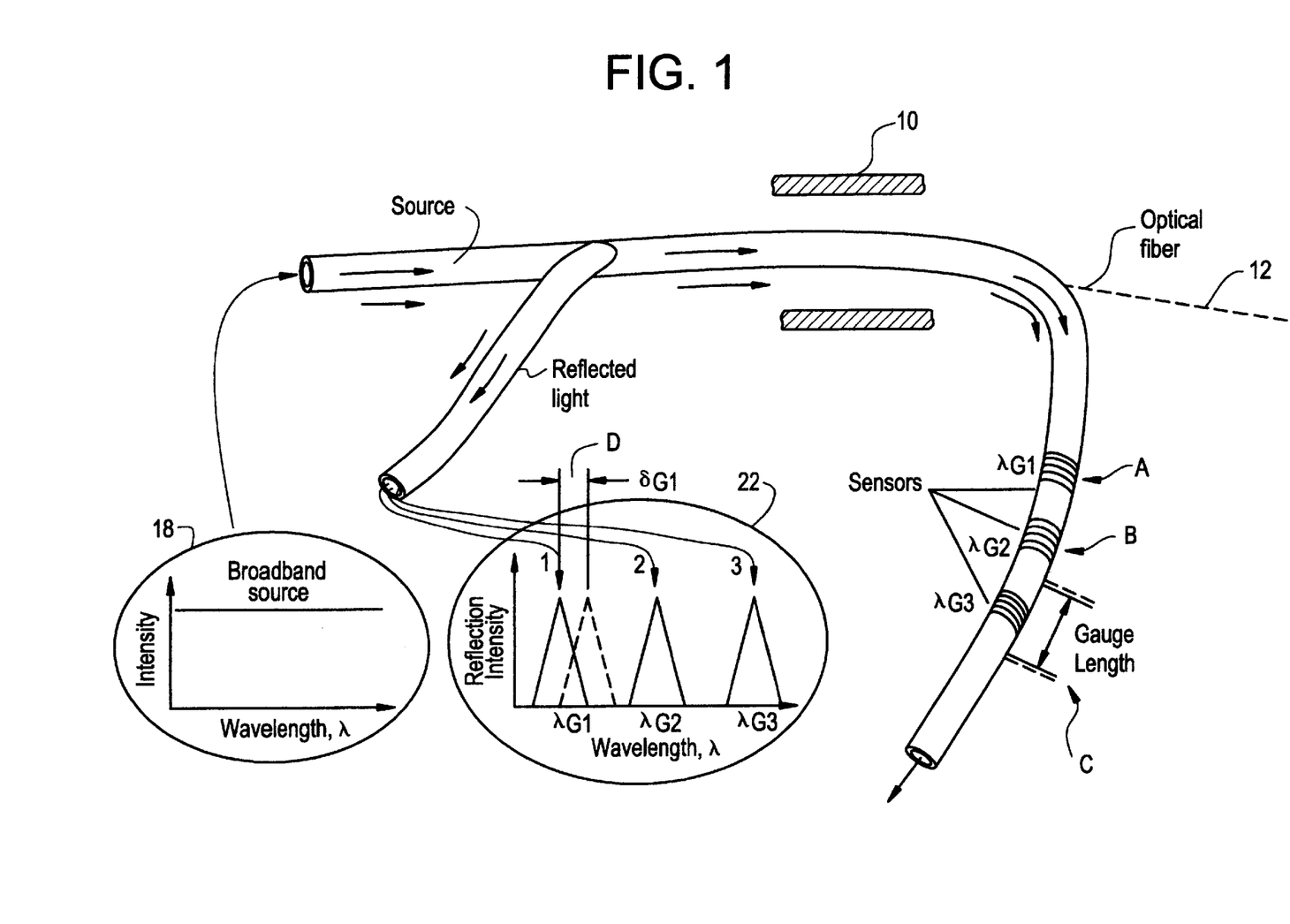
FIG. 1 is an illustration of the apparatus of the present invention applied to a flowline of a hydrocarbon production system.

The method to monitor changes in the internal pressure gradient within the production flowline, providing an early warning signal that a flow restriction is forming, is shown in FIG. 1.

The measurement system of the invention uses distributed fiber optic sensor cables 12 to measure hoop strain on the outside of the pipes 10 at multiple points A, B, C along the production system. The hoop strain is affected by changes in internal pressure such as occurs when paraffins, asphaltenes, scales, or hydrates build-up on the inside surface of the pipe. Because of the high sensitivity of the fiber optic sensors, and the high spatial resolution possible, changes in the hoop-strain profile along the production system can be used to detect relatively small changes in the internal pressure gradient.

Figure 2:
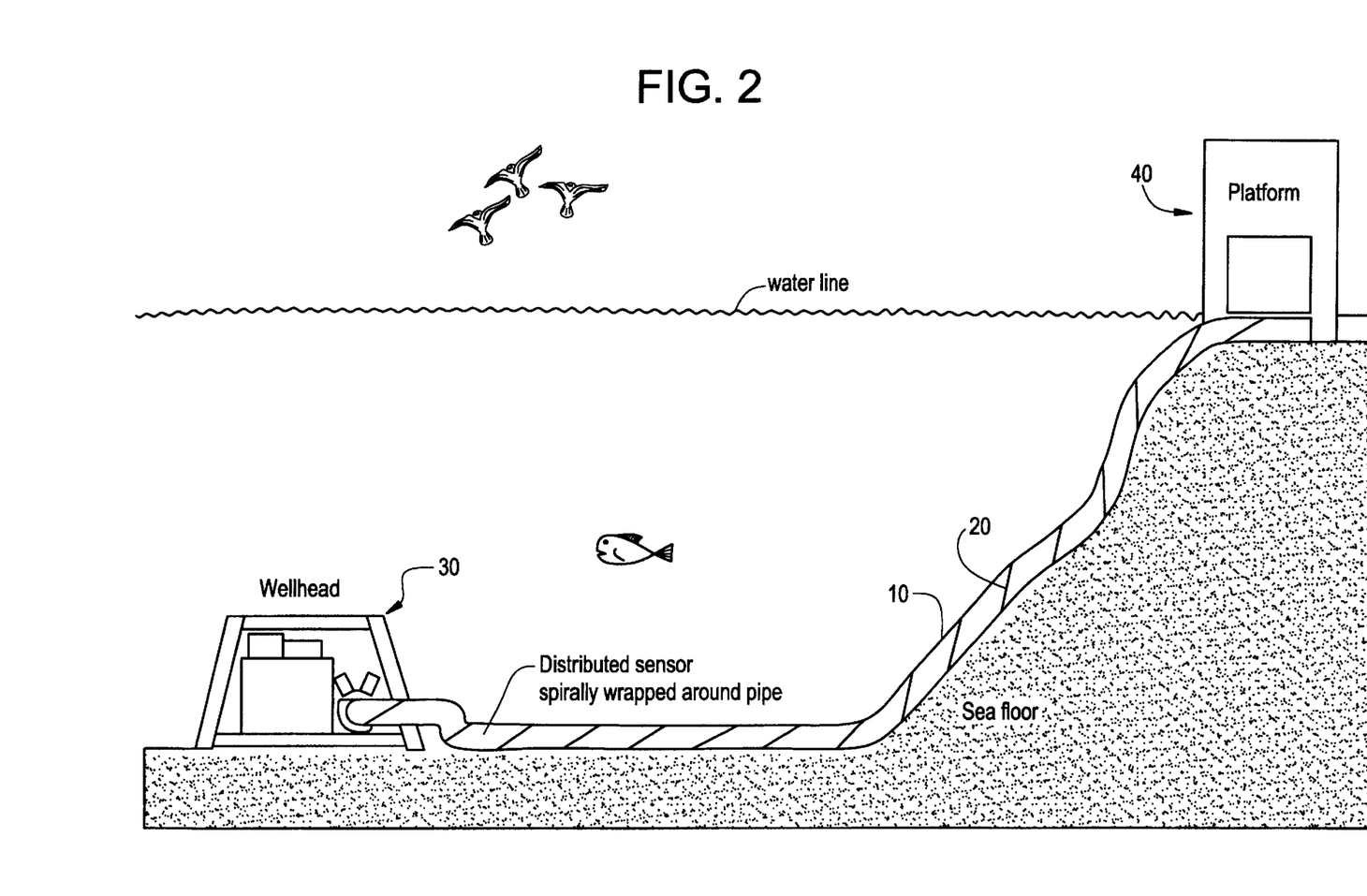
FIG. 2 is an illustration of a hydrocarbon production system with the present invention applied.

A sheathed fiber optic cable 20 may be spirally wrapped around the outside of the pipe 10 between the wellhead 30 and the platform 40 as illustrated in FIG. 2. The sheathed cable 20 is securely attached to the outside wall of the pipe 10 at discrete measurement locations along the pipe. The wavelength shift of light reflected from the Bragg grating sensors embedded within the optical fiber sense the hoop strain between each attachment point. Depending on how and where the gages are attached, axial strain and bending strain may also be detected. The optical power loss through Bragg grating sensors is much less than the power loss through microbend fiber optic sensors. Microbend is an alternate well known fiber optic strain gage technology used in commercial strain monitoring systems. These systems are limited to about six microbend sensors per optical fiber. In comparison, hundreds of Bragg grating sensors can be embedded into a single optical fiber and up to 60 sensors at a time can be interrogated. See Davis et al., "Interrogation of 60 Fiber Bragg Grating Sensors with the Microstrain Resolution Capability", *Elect. Letters,* Vol. 32, No. 15, Jul. 18, 1996, pg. 1393.

One technique for sensing hoop strain with a distributed fiber optic sensor cable is illustrated in FIG. 1. Light from a broadband white light source schematically shown at 18, is pulsed into the optical fiber. The white light passes through each of the multiple sensors at A, B and C, along the cable with a small amount of light reflected back from each sensor. Since a Bragg grating sensor consists of a periodic refractive index variation inside the fiber, each sensor may be manufactured with a different periodic variation. Then each Bragg grating sensor has a characteristic wavelength that identifies its spatial location along the fiber as shown at 22. As the optical fiber 12 is strained, the grating period changes and the wavelength of the reflected light changes proportionally (area D) at a rate of about 1.2 picometers per microstrain. (A microstrain is defined as $10^{-6}$ units of strain, or $10^{-6}$ inch/inch).

As an example, a fiber 30 kilometers long would contain 100 grating sensors distributed equidistant along the fiber length. If this fiber was encapsulated in an optical cable and spirally wrapped around a 4-inch pipe (OD=4.5 inches), the 30 kilometer cable would cover a linear length of about 17 miles. With uniformly distributed sensors along a 17 mile flowline, a strain measurement could be made approximately every 900 feet along the flowline. Alternatively, the strain measurements could be distributed over a much shorter length of the flowline where deposition is considered more likely to occur.

It is possible to reduce the number of strain gages in the optical fiber and increase the strain sensitivity of each Bragg grating strain gage. With 100 gages, a resolution of about 10 microstrain per gage is possible. If the number of gages in the fiber were reduced, strain resolution could be improved to better than 1 microstrain. With this resolution, the sensor can detect very small changes in hoop strain and thus internal pressure. Table 1 shows the change in internal pressure required to produce 1 microstrain change for several pipe sizes.

TABLE 1

PRESSURE CHANGE REQUIRED TO PRODUCE 1 MICROSTRAIN
($\mu\epsilon$)

| Pipe Size | Pressure Change Required for 1 $\mu\epsilon$, psi |
| --- | --- |
| 4" Sch 80 | 5.3 |
| 4" Sch 160 | 9.3 (93 psi/10 $\mu\epsilon$) |
| 6" Sch 80 | 4.5 |
| 6" Sch 160 | 8.3 |
| 8" Sch 80 | 3.9 |
| 8" Sch 160 | 8.0 |

Figure 3:
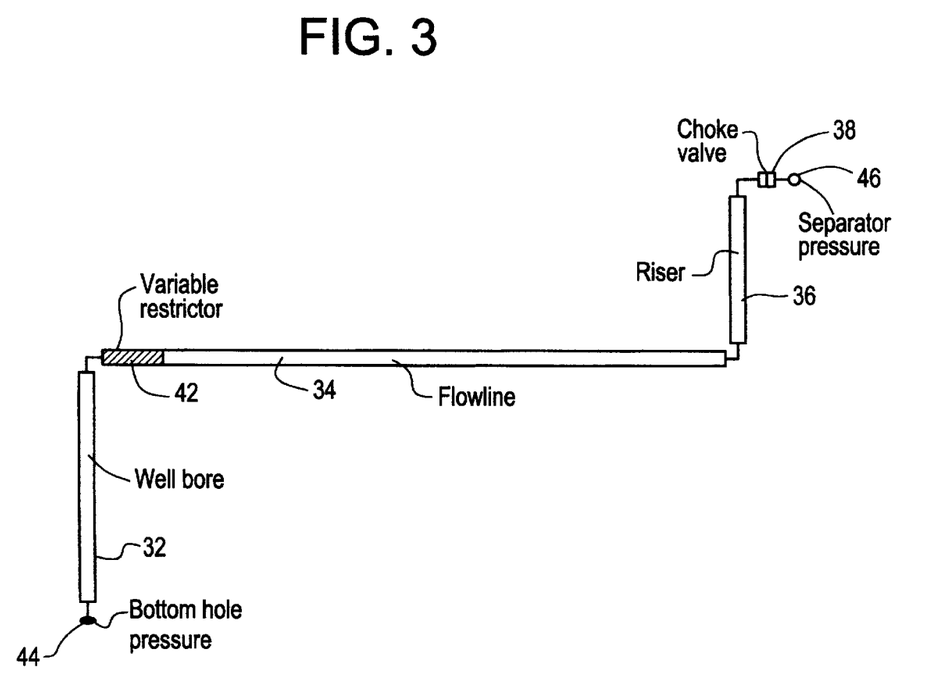
FIG. 3 is a side view of a simplified flowline system set-up used to verify the effectiveness of the present invention.
Figure 4:
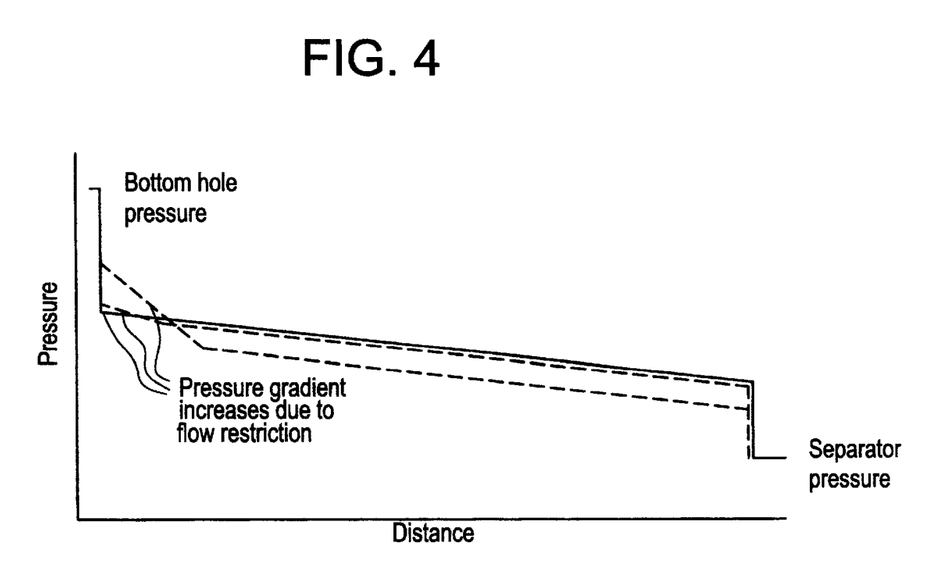
FIG. 4 is a graph plotting pressure against distance for the simplified production system of FIG. 3.

The simplified production system used for this evaluation and shown in FIG. 3 includes a vertical wellbore tube 32, a horizontal flowline 34, a vertical riser 36 and a choke valve 38. A variable restrictor 42 representing a flow restriction that grows with time, is located between the wellhead and the horizontal flowline. The pressures at each end of the pipeline (bottomhole pressure at 44 and separator pressure at 46) are assumed to be constant. Initially (with no flow restriction) the pressure gradient along the flowline decreases linearly between the wellhead and the riser. As a flow restriction forms, it back pressures the well, causing wellhead pressure to increase, which in turn causes a reduction in the wellstream flow. Because of the reduced flow, pressure downstream of the restriction will decrease to a value slightly below that without the restriction. Assuming a fixed-choke is used, a lower pressure would be delivered to the separator, however, the separator pressure control valve would respond to this and provide sufficient backpressure to maintain constant separator pressure. As the amount of restriction becomes greater (decrease the diameter of the flowline) the pressure gradient over the affected length will increase. As the restriction extends over a longer section of the flowline, the pressure drop will increase further. This changing pressure gradient with time indicates that a flow restriction has occurred, as illustrated in FIG. 4.

To investigate the feasibility of the proposed fiber optic sensor system for detecting the buildup of flow restrictions, the production system illustrated in FIG. 3 was used to estimate the change in pressure gradient along a flowline as the amount and extent of the restriction were varied. These results were then compared with the resolution of the hoop strain measurement to determine where detection might commence. The parameters assumed for this simplified production system are provided in Table 2. For simplicity, the diameter of the wellbore, flowline, and riser were assumed to be the same.

TABLE 2

CHARACTERISTICS OF SIMPLIFIED PRODUCTION SYSTEM

| | |
| --- | --- |
| Diameter | Varied from 4–8 inches |
| Wellbore Depth | 10,000 feet |
| Flowline Length | 5 miles |
| Riser Height | 2,000 feet |
| Length of Restrictor | 1,000 or 5,000 feet |
| Liquid Flowrate | 5,000 or 15,000 BPD |
| Bottom Hole Pressure | 6,000 psi |
| Separator Pressure | 700 psi |
| Fluid Density | 50 lb/cu ft. |
| Fluid Viscosity | 1.58 centipose |

The calculation procedure is briefly outlined below. For a given pipe diameter, and with the variable restrictor initially set to 0% (full pipe area available), the resistance of the choke valve was adjusted to establish the desired flowrate through the production system. The initial pressure distribution for the case with no restriction was then calculated. Various restrictions were then assumed, the new flowrate and subsequent pressure distribution along the piping system were computed. The choke was assumed to be a fixed resistance regardless of the amount of restriction. The pressure loss through the restriction includes only the frictional losses, and its friction factor is assumed to be similar to the clear pipe. In reality, one would also expect a shock loss, and an increased frictional component due to the deposit on the pipe wall.

Figure 5:
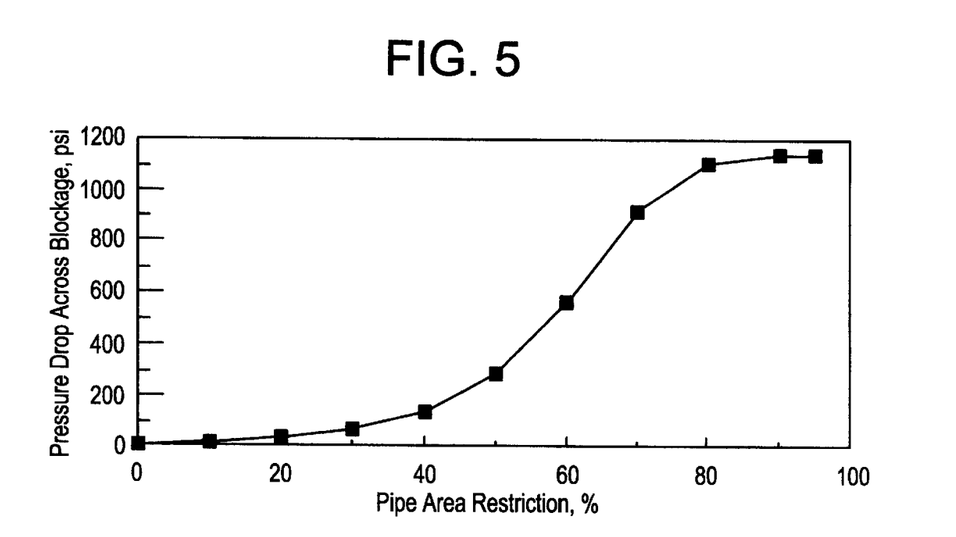
FIG. 5 is a graph plotting pressure drop across a blockage against pipe area restriction for a 1,000 foot length of restriction.
Figure 6:
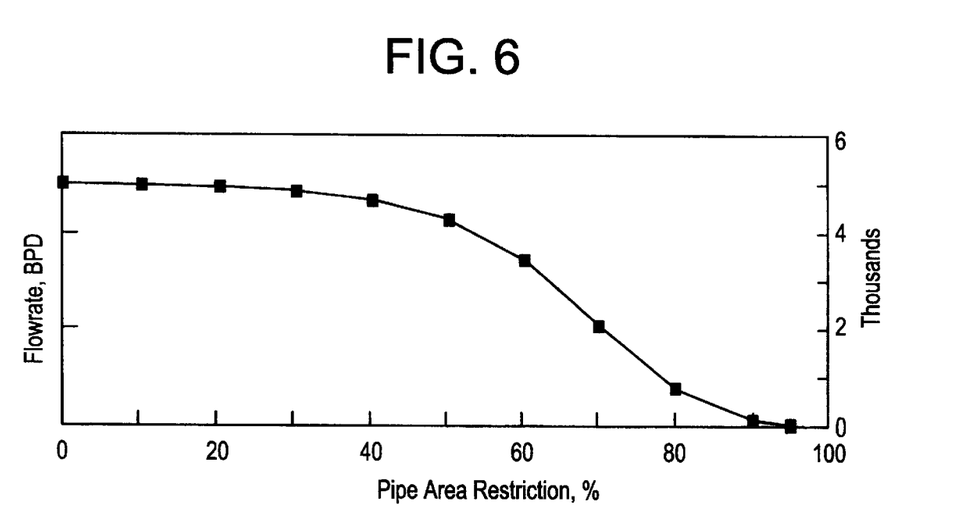
FIG. 6 is a graph plotting flow rate against pipe area restriction for the same restriction length as that of FIG. 5.

The calculated production flowrate and pressure drop across a 1,000 foot long flow restriction as a function of the percent restrictions are shown in FIGS. 5 and 6. This is for a 4-inch schedule 160 piping system, initially flowing at 5,000 barrels per day (BPD). It is noted that production flow declines very gradually with less than approximately 50% of the pipe flow area restricted. The flow drops off rapidly beyond about 60% restriction. The pressure drop across the restriction is measurable even at small amounts of restriction.

Figure 7:
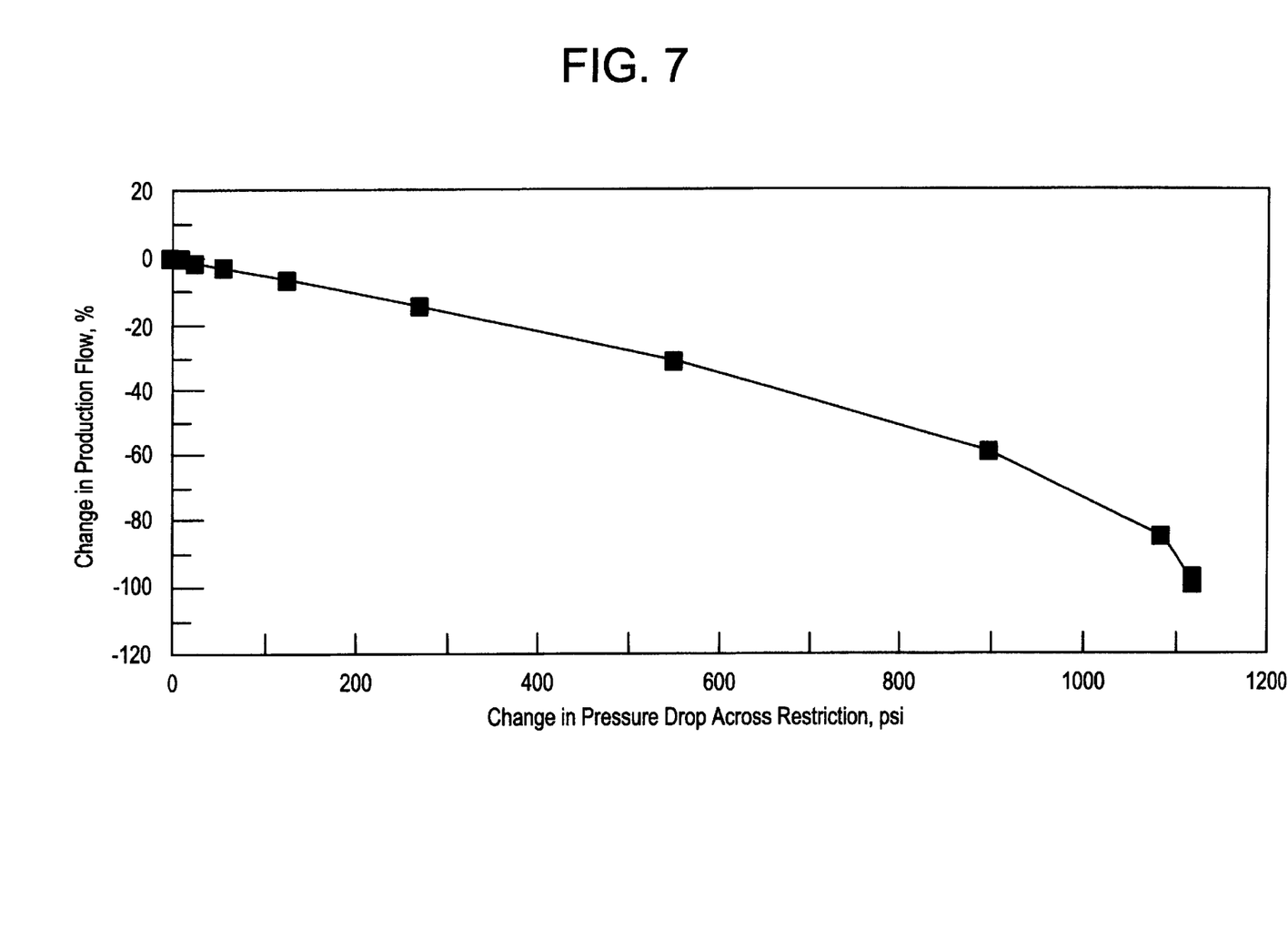
FIG. 7 is a graph plotting change in production flow against change in pressure drop across the 1,000 foot long restriction.
Figure 8:
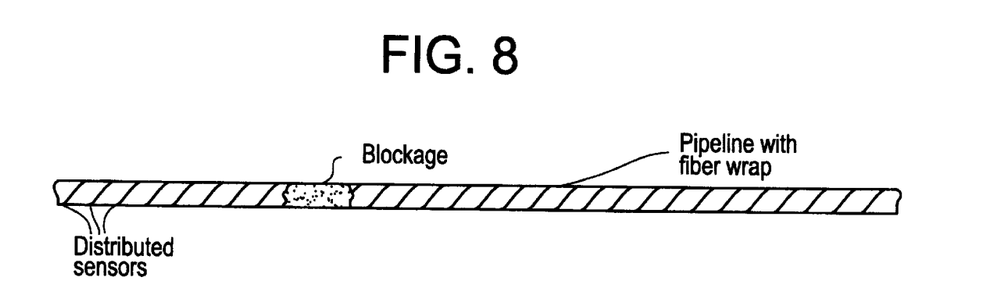
FIG. 8 is an illustration of the present invention in a pipeline having a blockage.
Figure 9:
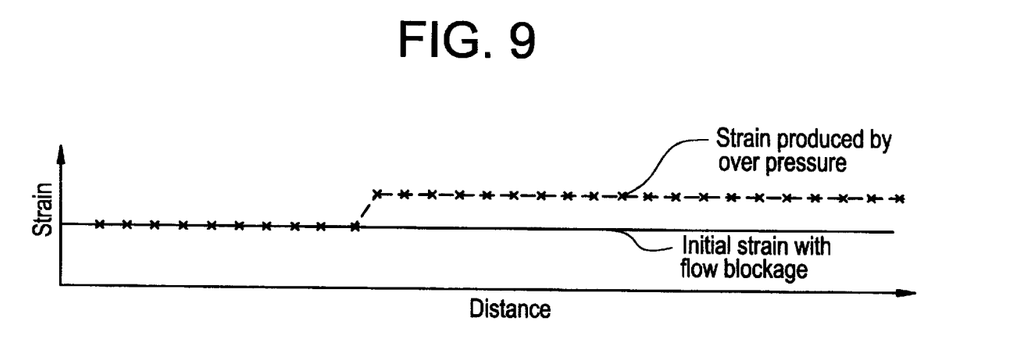
FIG. 9 is a graph plotting strain against distance to identify location of the blockage.

The change in production flow versus change in pressure drop across the restriction is shown in FIG. 7. The change in pressure drop across the restriction is very substantial when compared with the change in production flowrate. For this pipe size, 4-inch schedule 160 piping system, a 10 microstrain change in hoop strain corresponds to a change in pressure of 93 psi (see Table 1). This change occurs when the production flow has decreased by less than 5% (FIG. 7) and corresponds to about a 35% restricted area (see FIG. 5). For the production flowrate to decrease by 20%, the change in pressure drop across the restriction must be about 370 psi, corresponding to a restricted pipe area of about 53% (see FIGS. 5 and 6). This amount of change in the pressure gradient should be well within the limits of the subject invention.

The production flowrate drops off very gradually because the restriction represents only a small component of the total hydraulic resistance. The change in pressure gradient across the restriction appears to be detectable with the proposed system well before a significant reduction in production flow occurs.

The calculated decrease in production flow at a restriction that produces a 10 microstrain change across the flow restriction is provided in Table 3 for several pipe sizes with initial production flowrates and restriction length. The corresponding amount of pipe area restriction at the 10 microstrain change is also provided. So while the magnitude of pressure change at various points along the piping system is large enough to be sensed, the pressure change alone may not be sufficient for signalling that a flow restriction is forming because of the variations in pressure that typically occur in a hydrocarbon production system. However, the change in pressure gradient caused by the restriction will be a more sensitive indication that a restriction is forming. The system for measuring hoop (radial) strain along the production system flowlines, in combination with simple statistical data analysis techniques should provide an early warning that a flow restriction has formed well in advance of a significant decrease in production flow.

TABLE 3

CHANGE IN PRODUCTION FLOW DUE TO PIPE AREA RESTRICTION

| Pipe Size & Schedule | Production Flowrate, BPD | Length of Restrictor, Feet | Pipe Area Restriction at 10 $\mu\epsilon$ Change, % Full Pipe Area | Decrease in Flowrate at 10 $\mu\epsilon$ Change, % Full Flow |
|---|---|---|---|---|
| 4" Sch 80 | 5,000 | 1,000 | 34 | 2.5 |
| 4" Sch 160 | 5,000 | 1,000 | 35 | 4.6 |
| 4" Sch 160 | 5,000 | 5,000 | 17 | 4.8 |
| 6" Sch 80 | 5,000 | 1,000 | 32 | 1.9 |
| 6" Sch 80 | 15,000 | 1,000 | 52 | 2.0 |
| 6" Sch 160 | 15,000 | 1,000 | 35 | 4.3 |
| 8" Sch 80 | 15,000 | 1,000 | 45 | 1.7 |
| 8" Sch 160 | 15,000 | 1,000 | 48 | 3.5 |
| 8" Sch 160 | 15,000 | 5,000 | 31 | 3.9 |

One advantage of the present invention is the use of distributed fiber optic sensors to detect hoop strain and to use that information to track formation of restrictions to fluid flow in pipelines.

Depending on how and where the optical cable is attached, multiple Bragg grating sensors embedded within the optical fiber may sense axial strain, bending strain, hoop strain, or a combination of these. Multiple sensor fibers could be arranged in various geometries to enable discrimination among the different types of strain. The spiral wrap geometry is just one of many alternative configurations envisonable with the present invention.

In addition to the ability of this invention to provide early warning that a blockage is forming, the hoop strain can also be used to accurately locate and estimate the length of a blockage.

Once the blockage has formed and production flow has stopped, an overpressure can be applied from either end of the blockage to determine its location within the flowline. A "knee" in the hoop strain profile will indicate the boundary of the blockage. The pressure source can be applied from both the wellhead side, and platform side of the blockage to locate the upstream and downstream boundary of the blockage. An overpressure of approximately 200 psi, depending upon pipe size, will be sufficient to identify these boundaries. The technique will utilize pressurization equipment that is commonly available on a platform.

The ability to precisely locate the blockage will make the techniques for clearing the blockage more effective. This will save production downtime required to locate the blockage. In the event the line must be replaced, knowledge of the blockage location and extent will limit the amount of line to be replaced.

While a specific embodiment of the invention has been shown and described in detail to illustrate the application of the principles of the invention, it will be understood that the invention may be embodied otherwise without departing from such principles.

What is claimed is:

1. A sensing apparatus in combination with a flowline of a hydrocarbon production system, comprising:
   an optical fiber extending along the flowline;
   a plurality of optical strain gauges engaged to the flowline at spaced locations along the flowline, each optical strain gauge being operatively connected to the optical fiber; and light signal means connected to the optical fiber for indicating changes in strain experienced by the flowline and sensed by each of the optical strain gages, differences in the strain at spaced locations along the flowline indicating changes in a pressure gradient in the flowline between the locations, which identify the building of a restriction in the flowline between the locations.

2. An apparatus according to claim 1 wherein the flowline is connected between a wellhead and a platform for receiving and processing hydrocarbon.

3. An apparatus according to claim 2 wherein the optical fiber is an optical fiber cable.

4. An apparatus according to claim 3 wherein the optical fiber is spirally wound around and along the flowline.

5. An apparatus according to claim 4 wherein each optical strain gage comprises a Bragg grating sensor embedded into the optical fiber.

6. An apparatus according to claim 1 wherein each of the optical strain gages comprises a Bragg grating sensor embedded into the optical fiber.

7. An apparatus according to claim 6 wherein the optical fiber is spirally wound around and along the flowline.

8. An apparatus according to claim 7 including at least 3 Bragg grating sensors connected to said optical fiber and spaced along the flowline.

9. An apparatus according to claim 1, wherein a blockage in the flowline is located with the sensing apparatus.

10. An apparatus according to claim 9, wherein the sensing apparatus estimates a length of the blockage.

11. An apparatus according to claim 1 wherein the optical fiber comprises an optical fiber cable.

12. An apparatus according to claim 1 wherein the optical fiber is spirally wound around the flowline.

13. A method for sensing restrictions in the flowline of a hydrocarbon production system, comprising the steps of:

engaging an optical fiber along the flowline; and connecting a plurality of optical strain gages to the optical fiber, each optical strain gage being engaged with a flowline with the optical strain gages being spaced along the flowline; and applying and receiving light signals to and from the optical fiber to measure strain occurring in the flow line at each of the optical strain gages, changes in strain at spaced locations along the flowline indicating a pressure gradient in the flowline which corresponds to a flow restriction in the flowline.

14. A method according to claim 13, further including the step of providing Bragg grating sensors each embedded into the optical fiber as the optical strain gages.

15. A method according to claim 14, further including the step of spirally winding the optical fiber around and along the flowline.

16. A method according to claim 13, further comprising the step of locating a blockage in the flowline.

17. A method according to claim 16, further comprising the step of estimating a length of the blockage.

18. A method according to claim 13 wherein the optical fiber comprises an optical fiber cable, the optical fiber cable being wound around and along the flowline.

* * * * *